HAND-OPERATED CUTTING TOOLS

Filed Oct. 27, 1967 2 Sheets-Sheet 1

3,492,724

HAND-OPERATED CUTTING TOOLS

Anthony Goss, Mortlake, London, England, assignor to Goss Multiple Tools Limited, London, England, a British company Filed Oct. 27, 1967, Ser. No. 678,635
Int. Cl. B26b *13/00, 13/28*
U.S. Cl. 30—258 4 Claims

ABSTRACT OF THE DISCLOSURE

This specification describes a handtool for cutting sheet material of the kind comprising an anvil having a longitudinal slot and carried by a handgrip, and a cutter pivotally mounted in the slot in the anvil and which is also carried by a handgrip, said cutter having a blade, the cutting edge of which enters the slot in the anvil as the handgrips are squeezed together. The tool described has the handgrip of the anvil extending rearwardly and downwardly with respect to the pivot axis of the cutter and a portion at the rear of the tool which is shaped to fit into a human hand in the fork between thumb and forefinger.

This invention relates to a handtool for cutting sheet material, for example laminates, hardboard or sheet metal.

From one aspect, the invention provides a handtool for cutting sheet material, comprising an anvil having a longitudinal slot and carried by a handgrip, and a cutter pivotally mounted in the slot in the anvil and which is also carried by a handgrip, said cutter having a blade, the cutting edge of which enters the slot in the anvil as the handgrips are squeezed together and wherein the handgrip of the anvil extends rearwardly and downwardly with respect to the pivot axis of the cutter and a portion of the rear surface of the handgrip of the anvil is shaped to fit into a human hand in the fork between thumb and forefinger such that, when cutting a material, a forward manual thrust can readily be applied to the tool in the region of the anvil to resist the tendency of the tool to move rearwardly with respect to a piece of material on the anvil beneath the cutting edge of the blade as the handgrips are squeezed together to cut the material.

From another aspect, the invention provides a handtool for cutting sheet material, comprising an anvil having a longitudinal slot and carried by a handgrip, and a cutter pivotally mounted in the slot in the anvil and which is also carried by a handgrip, said cutter having a blade, the cutting edge of which enters the slot in the anvil as the handgrips are squeezed together and wherein the handgrip of the anvil extends rearwardly and downwardly with respect to the pivot axis of the cutter and also includes a portion formed as a rearward extension of the anvil and which forms at the rear end of the tool and closely below the cutting plane a recessed portion which fits into a human hand in the fork between thumb and forefinger with the ball of the hand resting on the rear surface of said handgrip.

Preferably the blade of the cutter is a shear blade having a convex curved cutting edge. With a blade having a convex curved cutting edge the blade may be returned to the open position by pushing the tool in the direction of the cut being made whilst releasing the cutter handgrip to allow it to move away from the anvil handgrip. When this is done the blade slides over the end of the cut already made. Also, especially when cutting laminates and other brittle and friable materials, the cutting edge of the blade advantageously has a transverse dimension so that during the cutting operation the blade forces a narrow strip of the material being cut downwardly through the slot in the anvil.

In order that the invention may be more readily understood reference will now be made to the accompanying drawings, in which.

Figure 1:
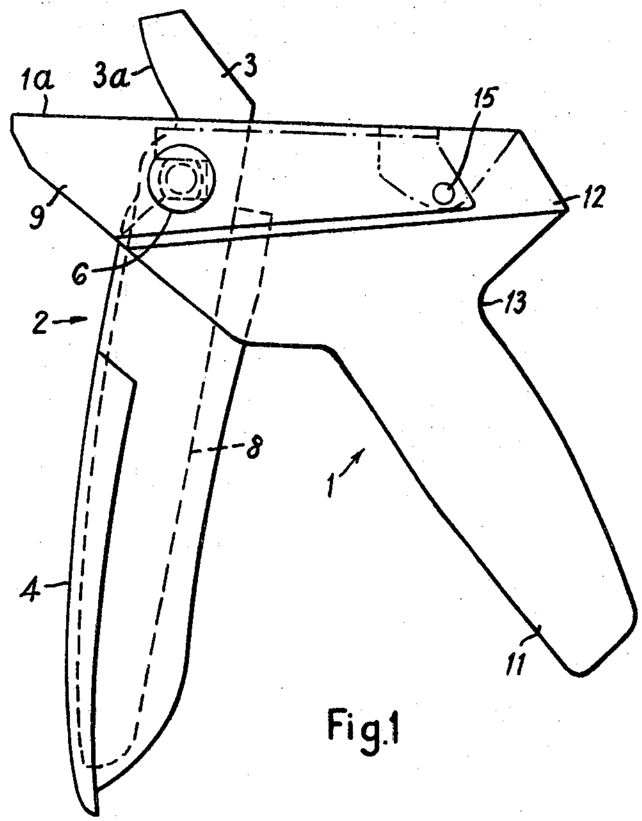
FIGURE 1 is a side elevation of one embodiment of tool according to the invention shown in the open position.

Referring to the drawings, the tool comprises an anvil generally indicated at 1 and a cutter generally indicated at 2. The cutter 2 comprises a blade 3 and a handgrip 4 which carries the blade. The blade 3 has a serrated convex curved cutting edge 3*a* which has a transverse dimension so that, in use, it cuts a narrow strip of material out of a sheet being cut. In one embodiment, the thickness of the blade is 1/16" and the blade is 3/4" long. In order to reduce sticking of the blade in the cut the serrations are rolled into the cutting edge 3*a* such that the latter is slightly wider than the blade, e.g. by a few thousandths of an inch. The cutter 2 is pivotally mounted in a slot 5 in the anvil 1 by means of a screw 6 which passes through the anvil itself and an aperture 3*b* in the blade 3 of the cutter. The screw 6 is secured in position by a knurled nut 7. The pivot axis (screw 6) of the cutter in the anvil is located nearer the front end of the anvil than to the rear end.

The blade 3 is made of steel and is provided with a tang portion 8 which is embedded in the handgrip 4. It is a simple matter to replace the cutter 2. The bolt 6 is withdrawn enabling the blade and handgrip assembly to be removed from the slot 5 of the anvil, whereafter another blade and handgrip assembly may be secured in position. The handgrip may be made of plastics material, such as fiber glass reinforced nylon.

The anvil 1 is made of resilient material which may also be fiber glass reinforced nylon and has an operative surface 1*a* formed by L-shaped strips 9 of steel or other suitable metal positioned along each side of the slot 5. The strips are seated in recesses in sidepieces 10 of the anvil and are fixed in position by a screw 15 which passes through the rear end of the strips themselves and the anvil behind the slot 5. The screw 15 is provided with a securing nut (not shown). Alternatively the sidepieces may be permanently secured in position by using a rivet instead of the screw and nut. The anvil is moulded with the sidepieces 10 slightly splayed apart towards their free or forward ends and therefore, by virtue of the resilience of the sidepieces 10, the width of the slot 5 may be adjusted by tightening or slackening the screw and nut mechanism 6–7. The narrower the slot 5 in relation to a given blade thickness, the better is the quality of the cut although the more effort is required to perform the cutting operation. Especially when cutting laminates, it is the quality of the rear surface of the sheet material being cut which suffers most as the width of the slot is increased. Thus, when the intended use of the material is such that its rear surface will be hidden, it may be possible to reduce the effort required to perform the operation by widening the slot 5 without detriment to the finished product. Generally speaking, the thicker the material the wider is the slot 5 required.

The anvil 1 terminates in a handgrip 11 which extends rearwardly and downwardly from the pivot axis (screw 6) of the cutter at an angle of about 50 degrees with respect to the operative surface 1*a* of the anvil 1. The handgrip 11 also includes a portion 12 formed as a rearward extension of the anvil and which defines at the rear end of the tool a recess 13. When the tool is held in the hand, the recessed portion 13 at the rear surface of the handgrip 11 fits snugly in the fork between thumb and forefinger with the ball of the hand resting on the rear surface of the handle proper.

In order to operate the tool the handgrip 11 of the anvil is held in either hand in the manner generally described above with the fingers, gripping the handgrip 4. The handgrips 4 and 11 are squeezed together causing the cutting edge 3*a* of the blade to enter the slot 5 in the anvil. When the handgrips 4 and 11 are squeezed together to cut a piece of material on the operative surface 1*a* of the anvil 1, the tendency of the tool is to move rearwardly with respect to the piece of material to be cut since the blade 3 will tend to push the material forwardly at the bite between the blade 3 and the surface 1*a* of the anvil 1. By virtue of the shape of the handgrip 11, a forward manual thrust is readily applied to the tool in the region of the anvil to resist this tendency. As will be seen from FIGURE 2, the front portion of the cutting edge of the blade 3 projects above the operative surface 1*a* of the anvil in the closed position of the tool. Thus the blade may be returned to the open position by continuing to apply the forward thrust whilst releasing the cutter handgrip to allow it to move away from the anvil handgrip. Thus the tool is simply operated to cut sheet material by applying a continuous forward manual thrust to the tool as described above whilst alternatively squeezing the handgrips together and releasing the cutter handgrip. When the tool is in the closed position with the handgrips 4 and 11 squeezed together, the rear part of the grip 4 engages in a slot in the grip 11 as shown in FIGURE 2.

Figure 2:
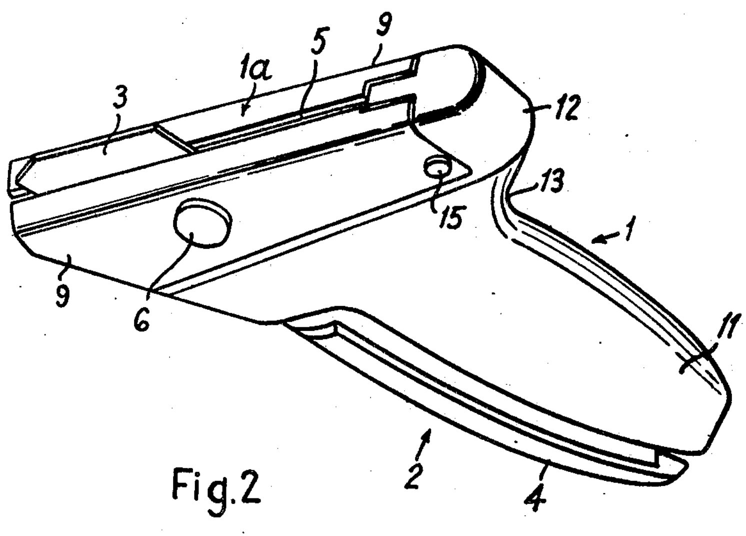
FIGURE 2 is a perspective view from above of the tool shown in FIGURE 1.
Figure 3:
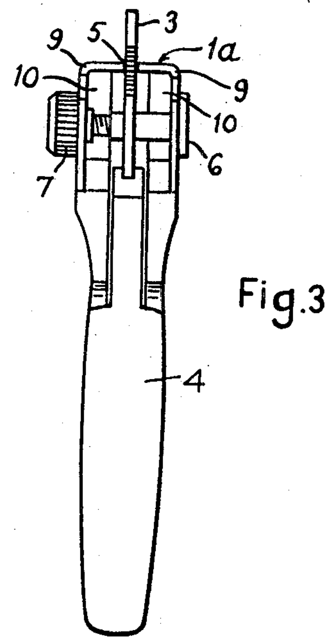
FIGURE 3 is a front end view.
Figure 4:
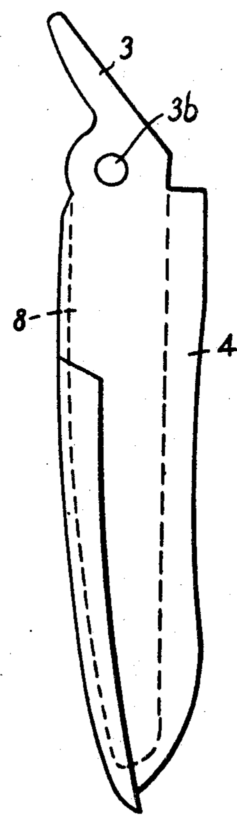
FIGURE 4 shows an alternative form of blade for use with the tool shown in FIGURES 1, 2 and 3.

Referring to FIGURE 4 there is shown an alternative cutter for use with the tool shown in FIGURES 1 and 2. The narrow blade of this cutter is particularly suitable for making curved cuts without having to bend the blade, and can thus be used for cutting shapes from sheet material.

I claim:

1. A hand-operated tool for cutting sheet material, comprising the combination of:

an anvil having an upper surface and a longitudinal slot near its front end and carried by a first handgrip near its rear end, a cutter pivotally mounted to project through said slot above the upper surface of the anvil and comprising a second handgrip, the pivot axis of the cutter being located nearer to the front end of the anvil than to the rear end, said cutter also comprising a blade whose cutting edge enters the slot in the anvil as the handgrips are squeezed together, said first handgrip extending angularly rearwardly and downwardly with respect to the upper surface of the anvil, a portion in the region of the anvil at the rear surface of the handgrip of the anvil being shaped to project into the fork in an operator's hand between thumb and forefinger to limit movement of the operator's hand upwardly along said handgrip of the anvil, whereby when cutting a material, the principal forward manual thrust applied by said hand to said tool is above a line through said pivot and the point at which said cutter and anvil are cutting said sheet material to resist the tendency of the tool to swing with respect to said sheet material on the anvil as the handgrips are squeezed to cut the material.

2. A tool as claimed in claim 1, wherein said blade is a shear blade having a convex curved cutting edge.

3. A tool as claimed in claim 1, wherein the cutting edge of the blade is provided with serrations formed in the cutting edge such that the latter is slightly wider than the blade.

4. A tool as claimed in claim 1, wherein the anvil includes sidepieces on either side of the slot in the anvil and is formed from a resilient material with the side pieces splayed slightly apart towards their free ends, a screw and nut mechanism for adjusting the width of the anvil slot, and said screw passing through the anvil and cutter and forming the pivot axis of the cutter.

References Cited

UNITED STATES PATENTS

| | | | |
|---|---|---|---|
| 2,914,851 | 12/1959 | Rogers | 30—258 X |
| 2,333,284 | 11/1943 | Willers | 30—258 X |
| 2,632,246 | 3/1953 | Shoffner | 30—258 X |
| 2,934,822 | 5/1960 | Docken | 30—258 X |

ROBERT C. RIORDON, Primary Examiner

J. C. PETERS, Assistant Examiner

U.S. Cl. X.R.

30—266